United States Patent [19]

Nakamura

[11] Patent Number: 5,243,454
[45] Date of Patent: Sep. 7, 1993

[54] LIQUID CRYSTAL DISPLAY DEVICE HAVING CORRECTING MEANS

[75] Inventor: Jumpei Nakamura, Chiba, Japan
[73] Assignee: Sony Corporation, Tokyo, Japan
[21] Appl. No.: 837,901
[22] Filed: Feb. 20, 1992

[30] Foreign Application Priority Data

Feb. 26, 1991 [JP] Japan .................................. 3-31106

[51] Int. Cl.⁵ ................................................ G02F 1/13
[52] U.S. Cl. ......................................... 359/85; 345/94
[58] Field of Search ............................ 359/84, 85, 55;
307/264; 340/784, 704, 767, 789

[56] References Cited

U.S. PATENT DOCUMENTS 3,868,674  2/1975  Lorteije ................................ 340/784

FOREIGN PATENT DOCUMENTS 0024849  3/1978  Japan .................................... 359/85
0093030  6/1983  Japan .................................... 359/85
0284732  12/1986  Japan .................................... 359/85

OTHER PUBLICATIONS

IBM, "Programmable viewing angle control for a liquid crystal display", IBM Technical Disclosure Bulletin, vol. 30, No. 3, Aug. 1987.

*Primary Examiner*—William L. Sikes
*Assistant Examiner*—Huy K. Mai
*Attorney, Agent, or Firm*—Lewis H. Eslinger; Jay H. Maioli; Donald S. Dowden

[57] ABSTRACT

A liquid crystal display includes a large liquid crystal panel, whose view angle changes, for displaying an image thereon in accordance with an image signal supplied to the liquid crystal panel, and a correcting circuit for changing a level of the image signal supplied to the liquid crystal panel within a predetermined period to thereby correct the change of display quality of the panel due to the change of the view angle.

5 Claims, 3 Drawing Sheets

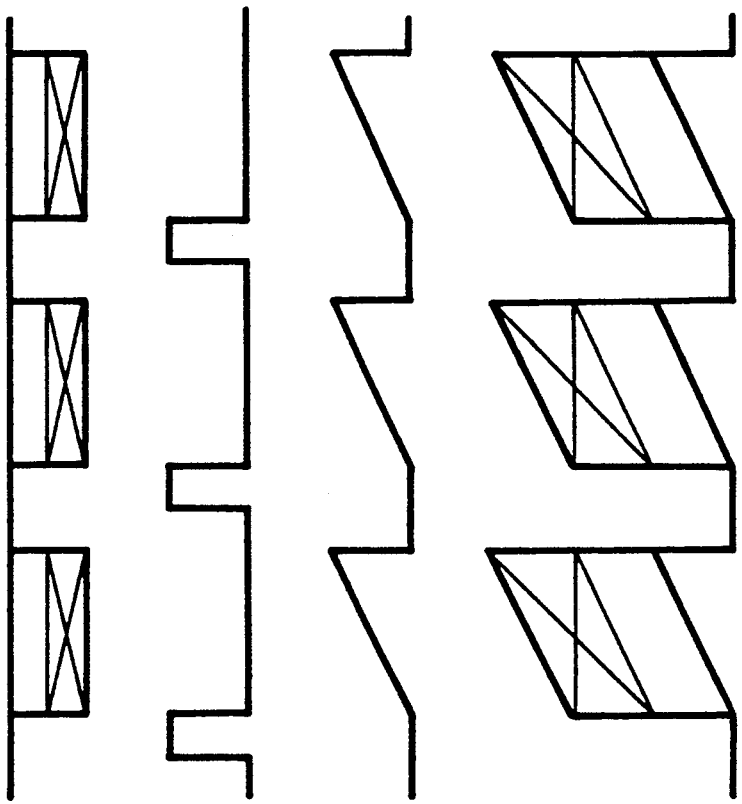

LIQUID CRYSTAL DISPLAY DEVICE HAVING CORRECTING MEANS

BACKGROUND OF THE INVENTION

1. Field of the Invention

The present invention generally relates to liquid crystal display devices and, more particularly, is directed to a liquid crystal display device having a large liquid crystal panel.

2. Description of the Prior Art

In case of performing the display of an image signal in the street, for example, a liquid crystal display device having a large liquid crystal panel is used. In the liquid crystal display device, however, since on a display portion of the liquid crystal panel are generally laminated a plurality of masks, the liquid crystal panel has such a property that the luminance thereof differs greatly depending on view angles of a viewer. Thus, when a large liquid crystal panel A is used, view angles $\theta1$ and $\theta2$ of a viewer B at upper and lower end portions thereof, for example, differ greatly as shown in FIG. 1. If the difference of the view angles $\theta1$ and $\theta2$ is not less than a predetermined value, the display quality of the liquid crystal panel such as luminance thereof changes between the upper and lower end portions for the viewer B, so that the viewer B may feel difficulty in viewing an image on the panel A.

OBJECTS AND SUMMARY OF THE INVENTION

Therefore, it is an object of the present invention to provide an improved liquid crystal display device having a large liquid crystal panel in which the aforementioned shortcomings and disadvantages encountered with the prior art can be eliminated.

More specifically, it is an object of the present invention to provide a liquid crystal display device having a large liquid crystal panel which can prevent the change of display quality of the liquid crystal panel due to differences of view angles from a viewer so that the viewer can view a good image on the panel.

As an aspect of the present invention, a liquid crystal display includes a large liquid crystal panel, whose view angle changes, for displaying an image thereon in accordance with an image signal supplied to the liquid crystal panel, and a correcting circuit for changing a level of the image signal supplied to the liquid crystal panel within a predetermined period to thereby correct the change of display quality of the panel due to the change of the view angle.

Thus, since the level of the image signal is changed within the predetermined period, the change of display quality due to the change of the view angle of the viewer is corrected, so that a viewer can view a good image on the panel.

The preceding and other objects, features, and disadvantages of the present invention will become apparent from the following detailed description of an illustrative embodiment thereof when read in conjunction with the accompanying drawings.

BRIEF DESCRIPTION OF THE DRAWINGS

FIGS. 3A through 3D are waveform diagrams used to explain operation of the liquid crystal display device of FIG. 2.

DESCRIPTION OF THE PREFERRED EMBODIMENT

A liquid crystal display device according to an embodiment of the present invention will now be described with reference to FIG. 2 and FIGS. 3A through 3D.

Figure 1:
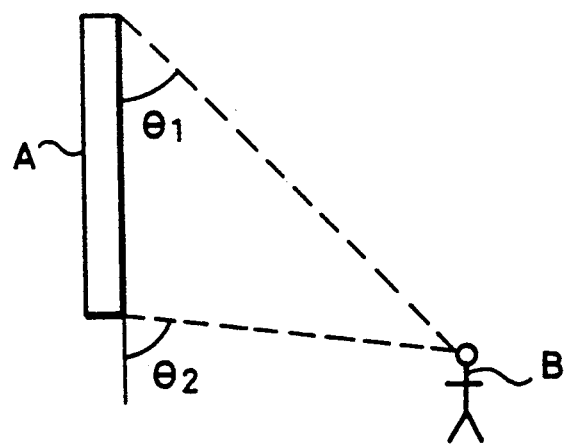
FIG. 1 is a schematic diagram used to explain the drawbacks of the prior-art liquid crystal display device.
Figure 2:
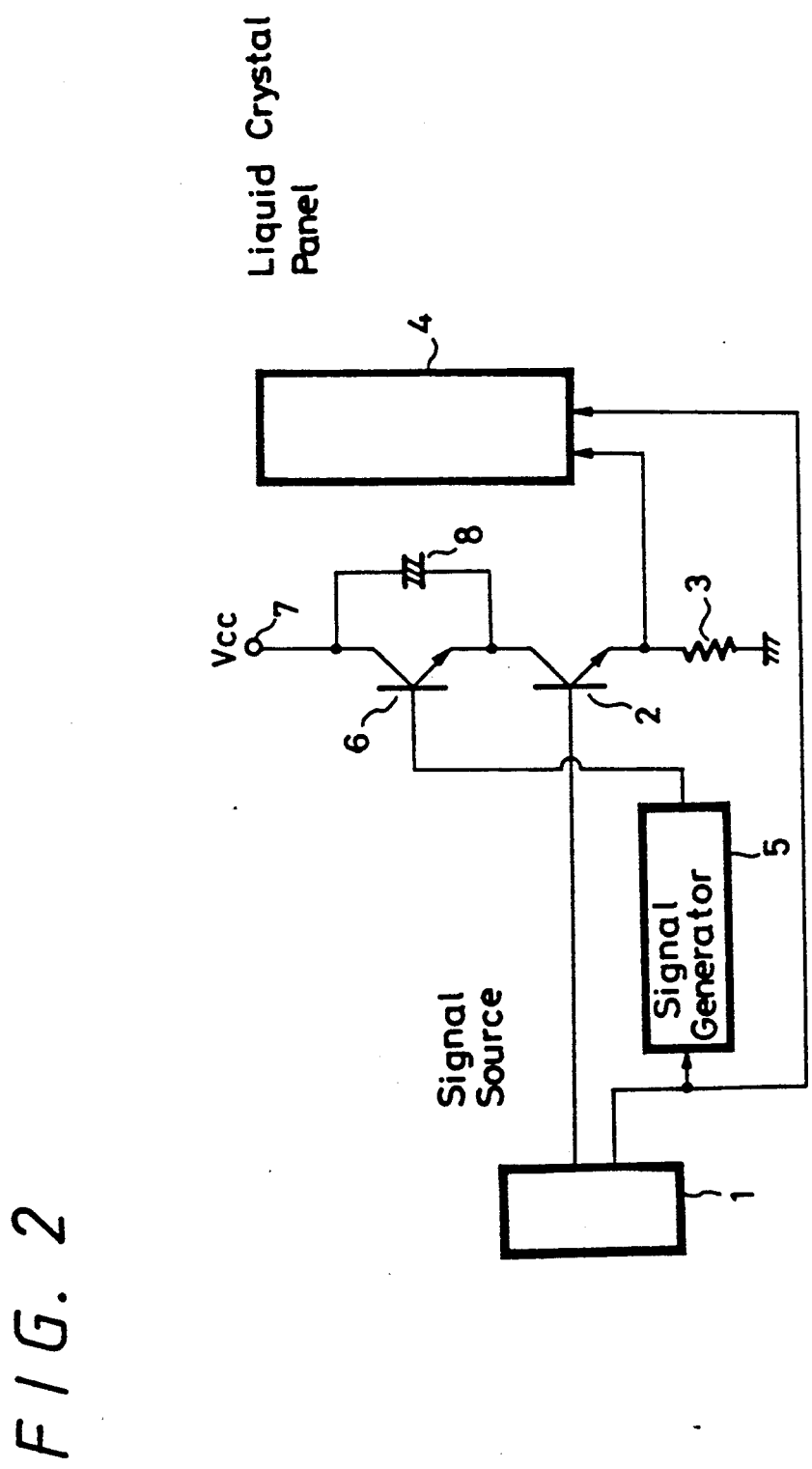
FIG. 2 is a block diagram showing a liquid crystal display device according to an embodiment of the present invention.

FIG. 2 shows in block form a liquid crystal display device according to the embodiment of the present invention.

Referring to FIG. 2, an image signal generated by a signal source 1 is supplied to the base of a transistor 2 whose emitter is grounded through a resistor 3. A signal produced on the emitter of the transistor 2 is applied to a liquid crystal panel 4 and a synchronizing (sync.) signal from the signal source 1 is supplied to the liquid crystal panel 4, whereby the image signal from the signal source 1 is displayed on the liquid crystal panel 4.

A vertical sync. signal from the signal source 1 is supplied to a signal generator 5 which generates a sawtooth wave signal or the like. The sawtooth wave signal generated by the signal generator 5 and having a period equal to that of the vertical sync. signal is supplied to the base of a transistor 6. A collector and an emitter of the transistor 6 are connected to a power supply terminal 7 being supplied with a power source voltage Vcc and the collector of the transistor 2, respectively. Further, a capacitor 8 is connected between the collector and the emitter of the transistor 6.

In the thus arranged liquid crystal display device, the image signal and the vertical sync. signal respectively shown in FIGS. 3A, 3B are delivered from the signal source 1, and the sawtooth wave signal shown in FIG. 3C having a period equal to that of the vertical sync. signal is delivered from the signal generator 5. Thus, the liquid crystal panel 4 is supplied with an image signal whose DC level is changed within one field, that is, one vertical period, as shown in FIG. 3D.

When the liquid crystal panel 4 is constructed such that the display thereof is normally white and a view angle of the viewer is selected to be proper in the display quality at the lower end portion of the panel, due to the change of the view angle, the luminance is changed to be lowered at, for example, the upper side portion of the panel. In such a case, the image signal is corrected by the arrangement of FIG. 2 in a manner that its DC level is decreased at the upper portion of the panel while increased at the lower portion thereof, whereby the luminance of the display is made higher toward the upper end portion of the panel and lower toward the lower end portion thereof to thereby equalize the luminance of the display all over the liquid crystal panel 4.

According to the arrangement shown in FIG. 2, since the level of the image signal from the signal source 1 is changed within every predetermined period by the circuit arrangement including the transistors 2, 6 and the signal generator 5, the change of display quality of the liquid crystal panel 4 due to the change of the view angle of the viewer is corrected, so that the viewer can view a good image on the panel.

When the liquid crystal panel 4 of the arrangement shown in FIG. 2 is arranged such that its display is normally black, the DC level of the image signal will be corrected by a sawtooth signal whose polarity is in opposite to that of the sawtooth signal shown in FIG. 3C. Further, when the view angle changes greatly between the right and left end portions of the liquid crystal panel 4, the change of the display quality, that is, luminance thereof may be corrected by generating a parabolic wave signal in synchronism with a horizontal sync. signal from the signal generator 5 instead of the sawtooth wave signal. Furthermore, when the contrast of the display changes depending on the view angle, it may be compensated for by correcting the amplitude of the image signal.

As set out above, according to the present invention, since the level of the image signal is changed within every predetermined period, the change of display quality due to the change of the view angle of a viewer is corrected, so that a viewer can view a good image on the panel.

Having described the preferred embodiment of the invention with reference to the accompanying drawings, it is to be understood that the invention is not limited to that precise embodiment and that various changes and modifications thereof could be effected by one skilled in the art without departing from the spirit or scope of the invention as defined in the appended claims.

What is claimed is:

1. A liquid crystal display device comprising:
   a large liquid crystal panel, whose view angle changes, for displaying an image thereon in accordance with an image signal supplied to said liquid crystal panel; and
   correcting means for changing a level of the image signal supplied to said liquid crystal panel within a predetermined period to thereby correct change of display quality of said panel due to the change of the view angle.

2. A liquid crystal display device according to claim 1, wherein said correcting means includes means for generating a sawtooth signal in synchronous with a vertical sync. signal of said image signal and means for superimposing the sawtooth signal on the image signal supplied to said panel.

3. A liquid crystal display device according to claim 1, wherein said correcting means includes means for generating a parabolic wave signal in synchronism with a horizontal sync. signal and means for superimposing the parabolic signal on the image signal supplied to said panel.

4. A liquid crystal display device according to claim 1, wherein said correcting means includes means for correcting an amplitude of the image signal.

5. A liquid crystal display device according to claim 1, wherein said predetermined period is a vertical synchronizing period of the image signal.

* * * * *